May 14, 1957     I. CIALENTE     2,792,181
CIRCUITS FOR THERMAL HEATING PLANTS
Filed Aug. 14, 1950

INVENTOR
*INNOCENZO CIALENTE*

BY *Young, Emery & Thompson*

ATTORNEYS

United States Patent Office 2,792,181
Patented May 14, 1957

2,792,181

CIRCUITS FOR THERMAL HEATING PLANTS

Innocenzo Cialente, Turin, Italy

Application August 14, 1950, Serial No. 179,161

Claims priority, application Italy August 16, 1949

3 Claims. (Cl. 237—63)

This invention relates to thermal plants for heating of rooms and premises and for technological elaborations, and its object is a novel type of circuit which use enables a considerable reduction of the weight of the needed material to be effected, said reduction in turn involving a reduction of the total cost of the plant, while the installation of the same plant is simplified, a notable saving of cost of labour being also achieved.

It is well known to those skilled in the art that thermal plants are divided into two main classes, i. e. water-plants and steam-plants. The plants of the first named type, which are generally the most used, present several drawbacks, such as the heavy weight of the material used (heating surfaces, pipings, etc.), difficulties for a central control of the plant in order to supply heat in the upper floors of very high buildings, difficulties in connecting remote plants with a single thermal source, and so on. The plants of the second type, which are confined to particular cases of use of producing steam, present likewise no light drawbacks, though their weight, by reason of the circulating speed and of the smaller mass of employed fluid, is noticeably inferior to that of the corresponding hot-water plants. Also, it is well known that a central control of the plant during different seasons is difficult to maintain and one must have recourse, in such plants, to the employment of several different fittings, which structure and service require a rather careful management.

In order to profit at once from the advantages of the two types of plants, some layouts of circuits intermediate between said extreme types have been proposed, according to which a fluid, generally water, is employed which is heated and maintained at a temperature greater than the boiling temperature at normal pressure, i. e. for the water, to a temperature beyond of 100° C. (212° F.). Said circuits have not been adopted, for several reasons, namely, the necessity for employing skilled persons, latent danger in the servicing of said circuits, and the periodic inspection and control by authorities in the building trade.

It is an object of the present invention to eliminate the drawbacks encountered with said transition network layouts, by means of a novel type of circuit, in which an intermediary fluid is used, which is heated to a temperature greater than the boiling temperature at atmospheric pressure; in said circuit the fluid can be circulated solely by the difference of density between hot and cold fluid, or by a pump; the devices intended to utilise the heat energy are connected in a single circuit, the fluid traveling in said devices gradually gives up heat and when it reaches the last one of the series it is brought to the pressure of the atmosphere or very close to it, without boiling. In the remainder of the circuit, as the thermal cycle proceeds, between the last heat exchanger and the boiler, the hydrostatic pressure, as well as the pressure due to the use of the circulating pump, the highest temperatures of the cycle are reached with a consequent saving in heat.

The invention will better be understood by the following description of some preferred forms of circuit, reference being had to accompanying drawings, in which.

Figure 1:
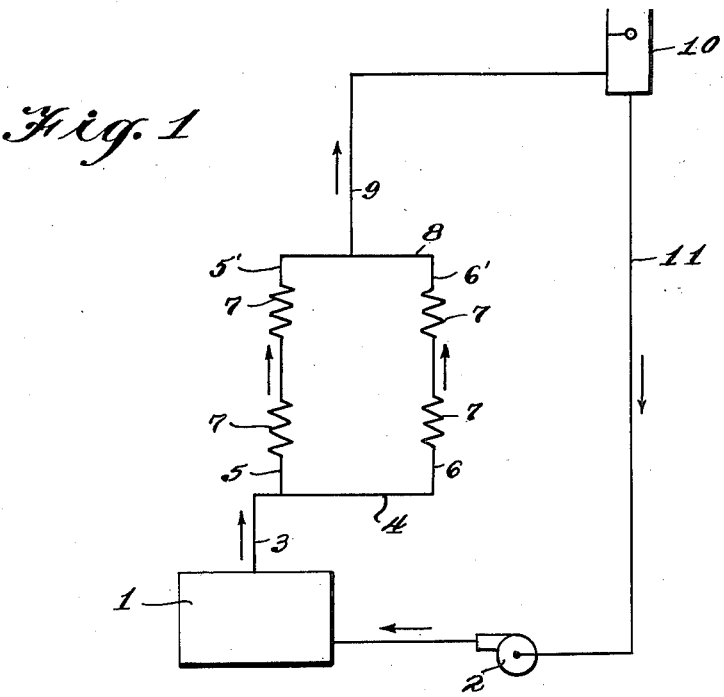
Fig. 1 is a schematic representation of said type of circuit, serving four heat utilising devices.

Referring now to the drawings, and particularly to Fig. 1: Water heated in the heater 1 is fed up through riser 3 to a manifold 4 for supplying the hot water under pressure to the inlet pipes 5 and 6 of the two heat exchangers (or radiators) 7 located at the same level, for instance, the first floor of a building.

Above each heat exchanger 7 is located a second heat exchanger 7 at a level corresponding for instance to the second floor of the building. The upper and lower heat exchangers of each vertical pair are serially connected. In other words, the outlet of the lower heat exchanger is connected to the inlet of its corresponding upper heat exchanger.

The outlets 5' and 6' from the upper heat exchangers are connected through a manifold 8 to a common discharge or stand pipe 9 which discharges at its upper end into an expansion vessel 10. The expansion vessel is connected by a conduit 11 to the intake of pump 2 for recirculating the water.

It will be readily understood that the water at the discharge side of pump 2 and in the heater 1 will be at the highest pressure and that the pressure of the water will decrease from a maximum at the discharge side of the pump 2 to a minimum in the expansion vessel.

Since the heater 1 is at the region of maximum pressure, the temperature of the water at this high pressure region can be raised above 100° C. without the water boiling.

As the water heated above 100° C. passes upwardly through the lowest convector or heat exchanger 7, its temperature is reduced and also, due to the elevation, the pressure is less. By the time the water has passed through the vertical series of heat exchangers or convectors 7, its temperature is reduced below 100° C. so that it will not boil even at atmospheric pressure.

Other advantages are obtainable with the circuit layout according to the invention, such as the following:

(1) The air blowing-off from the heating elements is in an easy and natural manner effected, owing to the water ascensional motion, obtainable when it traverses the said elements. Therefore, the small blow-off valves, attached to the normal heating elements or the air tubings between the top of the vertical pipe lines and the level of the expansion vessels, are eliminated and, consequently, the possibility of circulation defects due to air bubbles are eliminated.

(2) Any danger due to an excessively forced combustion for plants of the "thermoconvector" or "aerothermal" with air fluid control type is eliminated, as all the consequences would be reduced to a free overflowing from the expansion vessel, even if the heating elements are not feeding the heat (i. e. when the air flux is reduced).

(3) It is possible to connect in the same circuit several utilisers at same level, even if obstacles are interposed, by having the water pipe pass below the obstacle while the air is conducted to air blowing-off pipes.

(4) The two T-shaped connecting pipes normally used for each heating element are eliminated, when "thermoconvectors" of the throttle valve type, which are able to be traversed by the whole water of the vertical tubing, even in case of reduced load, are used.

Figure 2:
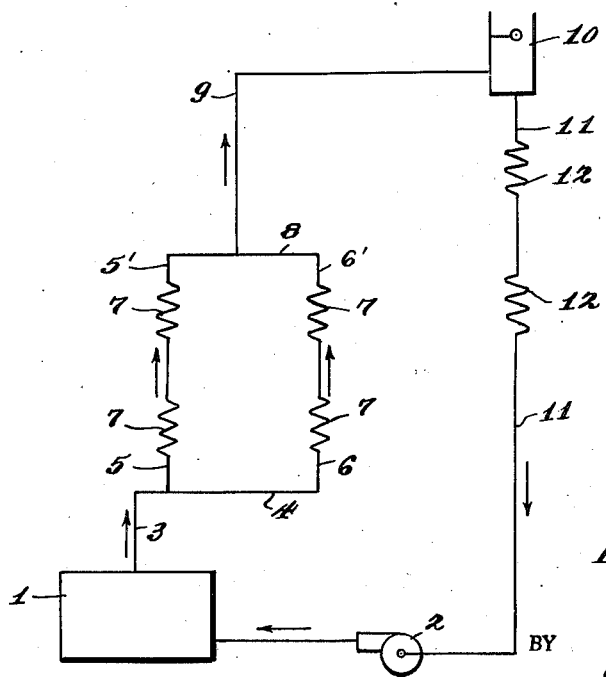
Fig. 2 represents a circuit similar to that of Fig. 1, but according to a different embodiment of the invention.

A modified form of system is shown in Figure 2 of the drawing in which two auxiliary heat exchangers 12 are placed in series in the return line 11 between the expansion vessel 10 and the intake of the pump 2 to utilise the heat in the water flowing in the return line.

Although two embodiments of the generic circuit according to the present invention have been disclosed in the foregoing specification, it is understood that other modifications may be used without departing from the true spirit and meaning of the invention itself.

What I claim is:

1. A hot water heating system comprising a water heater having an inlet and an outlet and positioned at a low level in the system, a plurality of heat exchangers having inlets and outlets and positioned at successively higher levels above the heater, a riser connecting the outlet of the water heater with the inlet of the lowest one of the heat exchangers, conduits connecting the outlet of the first mentioned heat exchanger serially with other heat exchangers at higher levels, means for heating the water in the heater to a temperature above 100° C., means for circulating water through the heater and from the heater serially through the heat exchangers under super-atmospheric pressure to prevent boiling of the water, and an expansion vessel positioned at a level above the highest heat exchanger, a pipe connecting the outlet of the highest heat exchanger to said expansion vessel, said vessel being open to the atmosphere for releasing the pressure on the water, and a line for returning water from the expansion vessel to the circulating means.

2. A hot water heating system according to claim 1 in which the highest heat exchanger of the series is of the thermo-convector type.

3. A hot water heating system according to claim 1 in which the highest heat exchanger of the series is of the thermo-convector type, and heat-exchanger means are interposed in the return pipe.

References Cited in the file of this patent

UNITED STATES PATENTS

| 427,634 | Stuart | May 13, 1890 |
| 1,437,187 | MacDonald | Nov. 28, 1922 |
| 2,020,064 | Kehm | Nov. 5, 1935 |
| 2,065,789 | Bolsinger | Dec. 29, 1936 |
| 2,246,802 | Kehm et al. | June 24, 1941 |

FOREIGN PATENTS

| 415,350 | Great Britain | Aug. 23, 1934 |
| 433,993 | France | Nov. 13, 1911 |